United States Patent [19]

McGregor et al.

[11] Patent Number: 5,983,743
[45] Date of Patent: Nov. 16, 1999

[54] ACTUATOR ASSEMBLY

[75] Inventors: Ronald W. McGregor, Hallsville; Ronn G. Madrid, Midland, both of Tex.; Roy Mackenzie, Aberdeen, United Kingdom; Stanley A. Weise, Waxahachie, Tex.

[73] Assignee: Dresser Industries, Inc., Dallas, Tex.

[21] Appl. No.: 08/819,759

[22] Filed: Apr. 3, 1997

[51] Int. Cl.⁶ .............................. F16H 1/18; F16H 27/02; F16K 31/02

[52] U.S. Cl. ................. 74/424.8 VA; 74/89.15; 251/129.13

[58] Field of Search .................... 74/424.8 VA, 89.15; 403/327, 328; 464/61, 139; 192/223, 223.2, 12 B; 251/129.11, 129.13, 129.17, 58, 71

[56] References Cited

U.S. PATENT DOCUMENTS

| | | |
|---|---|---|
| 4,273,307 | 6/1981 | Malinski et al. . |
| 4,660,428 | 4/1987 | Payne . |
| 4,691,893 | 9/1987 | Akkerman et al. . |
| 4,741,508 | 5/1988 | Fukamachi . |
| 4,920,811 | 5/1990 | Hopper . |
| 4,920,816 | 5/1990 | Inabe et al. ........................ 74/424.8 A |
| 5,137,257 | 8/1992 | Tice ................................ 74/424.8 VA |
| 5,195,721 | 3/1993 | Akkerman . |
| 5,410,785 | 5/1995 | Huang ................................ 403/328 X |
| 5,832,779 | 11/1998 | Madrid et al. ................. 74/424.8 VA |
| 5,865,272 | 2/1999 | Wiggins et al. ................ 74/424.8 VA |
| 5,916,325 | 6/1999 | Madrid et al. ............... 74/424.8 VA X |

*Primary Examiner*—Thomas R. Hannon
*Assistant Examiner*—Brandon C. Stallman
*Attorney, Agent, or Firm*—Haynes and Boone, L.L.P.

[57] ABSTRACT

An actuator assembly for moving a device between a retracted and extended position in which a ball screw is connected to the device and is in threaded engagement with a ball nut so that, upon rotation of the ball nut, the ball screw moves between a retracted and an extended position. A gear train is connectable between a power source and the ball nut for transferring torque therebetween to rotate the nut member, and a control system responds to a relatively low power input for selectively connecting the drive assembly between the power source and the ball nut member.

18 Claims, 3 Drawing Sheets

ACTUATOR ASSEMBLY

BACKGROUND OF THE INVENTION

The present invention relates to an actuator assembly and, more particularly, to such an assembly which provides translational movement of a ball screw between an extended and a retracted position.

Actuators, in which a helically grooved ball screw is mounted for reciprocal axial movement in a ball nut, are used in many environments in which translational movement of a device is desired. The ball nut is secured against axial movement and is rotated to cause corresponding axial movement of the ball screw between an extended and retracted position. Actuators are used with many devices, such as, for example, gate valves or the like, which are attached to the ball screw for translational movement therewith. The ball nut can be rotated by fluid pressure as disclosed in U.S. Pat. No. 4,691,893; by an electrical motor as disclosed in U.S. Pat. No. 5,195,721; or in any other conventional manner.

In some of these systems, an inner race is driven, via a reduction gearing system, by the power source and is coupled to a driver by a wrap spring which functions as a clutch. The driver is connected, by a gear and pinion, to the ball nut for rotating same. A low power activating device, such as an electrical solenoid, or switch, is usually provided which, when activated by a relatively low power signal, engages a control module that latches to the driver and therefore couples the driver to the inner race by causing the wrap spring to couple the inner race to the driver. This, in turn, causes the ball nut to rotate and the ball screw to extend from the ball nut and move to its fully extended position. A stem is usually connected to the ball screw for receiving a gate valve, or the like, which moves with the ball screw.

When it is desired to retract the ball screw, the low power activating device is deactivated, causing the control module to release the wrap spring from its coupled position and thus release the connection between the rotating inner race and the driver. A helical spring is provided which is compressed during the above extended position of the ball screw and which urges the ball screw back to its retracted position when the above connection between the inner race and the driver is released.

However it is particularly difficult to control the large forces required to retract and extend the ball screw against high pressure with a very small force required to actuate the control module which latches to the driver. A main reason for this difficulty is that high gain "amplifiers" of this type tend to be unstable and thus unreliable. Also in these arrangements, multiple gears are usually provided between the control module and the ball nut. Therefore, when there is a malfunction of the coupling mechanism for whatever reason, a catastrophe can occur since several gears could become jammed.

Also in these types of arrangements, when the ball screw is in its extended position, after the motor has been turned off, and the control module been be de-energized, the gears connecting the motor are subjected to a reverse, or "backward" torque which can cause damage. Further, in some of these designs the torque from the rotating ball nut is transferred to the stem 78 which could compromise the operation of a component, such as a valve, or the like, connected to the stem.

Therefore, what is needed is an actuator assembly that controls the large forces required to retract and extend the ball screw with a control module that latches the system in response to a holding signal from an activating device that consumes a relatively low amount of power for a relatively long time. Also needed is an actuator assembly of the above type that is stable and reliable and, as such, resists vibration and environmental factors which tend to "trip" the unit. Further an actuator assembly of the above type is needed in which minimal gearing is provided between the control module and the ball nut to eliminate the possibility of multiple gears becoming jammed if a malfunction occurs. Also needed is an actuator assembly of the above type in which backward rotation of the gears of the drive assembly is prevented and in which the stem, and therefore any valve, or the like, connected to the stem, is not subject to any torque from the rotating ball nut.

SUMMARY OF THE INVENTION

Accordingly, the actuator assembly of the present invention is designed to move a device, such as a gate valve, or the like, axially between a retracted and extended position and includes a ball screw connected to the device and in threaded engagement with a ball nut. As a result, upon rotation of the ball nut, the ball screw, and therefore the device, moves between the retracted and extended positions. A gear train is selectively connected between a power source and the ball nut for transferring torque therebetween to rotate the nut member, and a control module selectively connects the drive assembly between the power source and the ball nut member. The control module is activated by a relatively low power input and engages the inner wall of a driver connected to the ball nut to latch to the driver and tighten a wrap spring around the driver and a race member connected to the power source. Thus, torque from the power source is transferred to the ball nut to rotate the ball nut and move the ball screw, and therefore the device connected to the ball screw, between the extended and retracted positions. Also, a clutch is provided to prevent backward rotation of the gears of the drive assembly, the ball screw is locked against any rotation, and the stem and its associated components are not directly connected to the ball screw.

The actuator assembly of the present invention enjoys the advantage of controlling the large forces required to retract and extend the ball screw with a device that latches to the driver in response to a holding signal that consumes a relatively low amount of power for a relatively long time. Also, by virtue of the control member engaging the inner wall of the driver connected to the ball nut, the connection between the control module and the driver is stable and reliable and, as such, resists vibration and environmental factors which tend to "trip" the unit. Still another advantage of the actuator assembly of the present invention is that minimal gearing is provided between the control module and the ball nut to eliminate the possibility of multiple gears becoming jammed if a malfunction occurs. Also, backward rotation of the gears of the drive assembly is prevented and no torque from the rotating ball nut is transferred to a valve, or the like, connected to the stem.

DESCRIPTION OF THE PREFERRED EMBODIMENT

Figure 1:
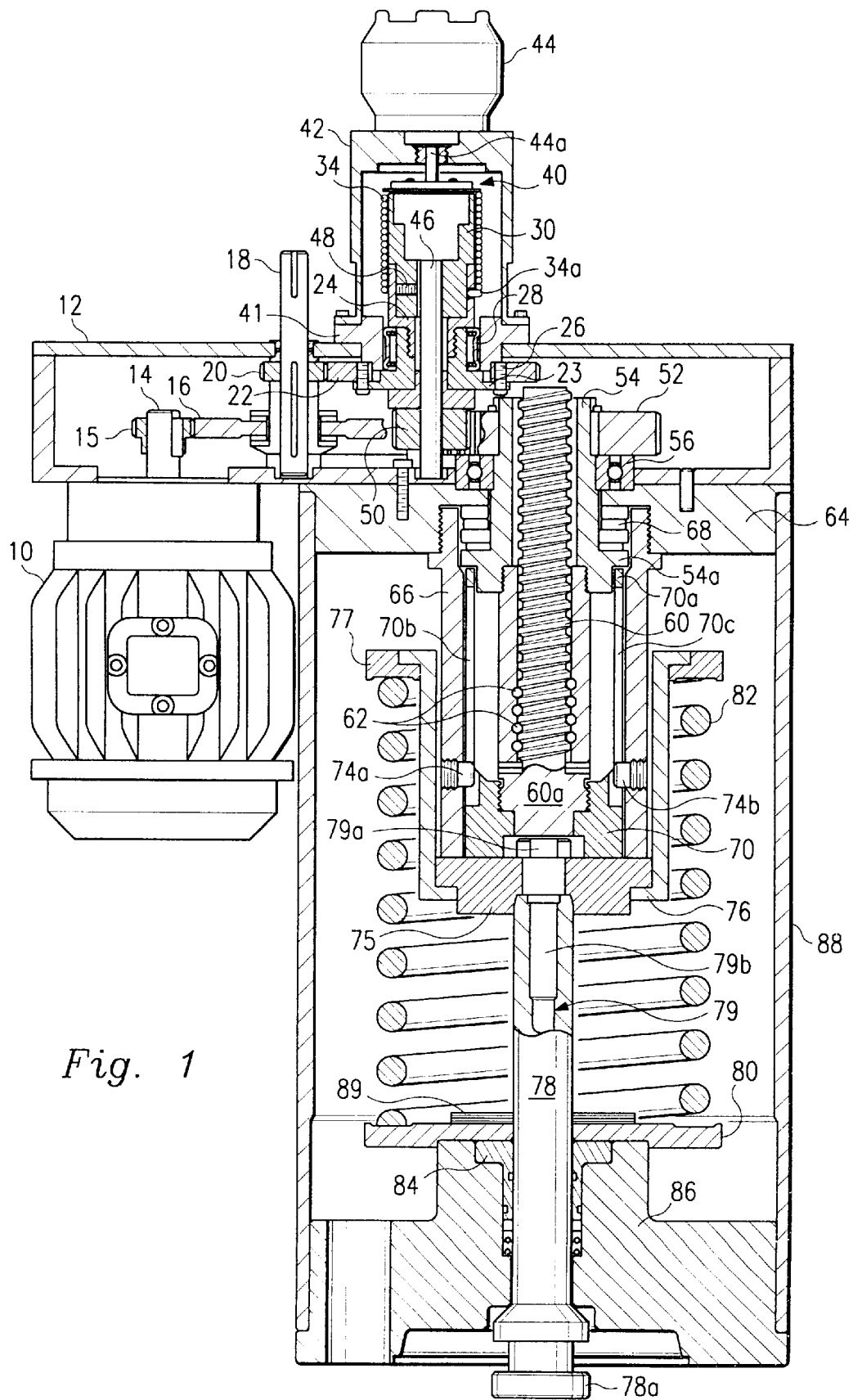
FIG. 1 is a vertical sectional view of the actuator of the present invention shown with its ball screw in a retracted position.
Figure 2:
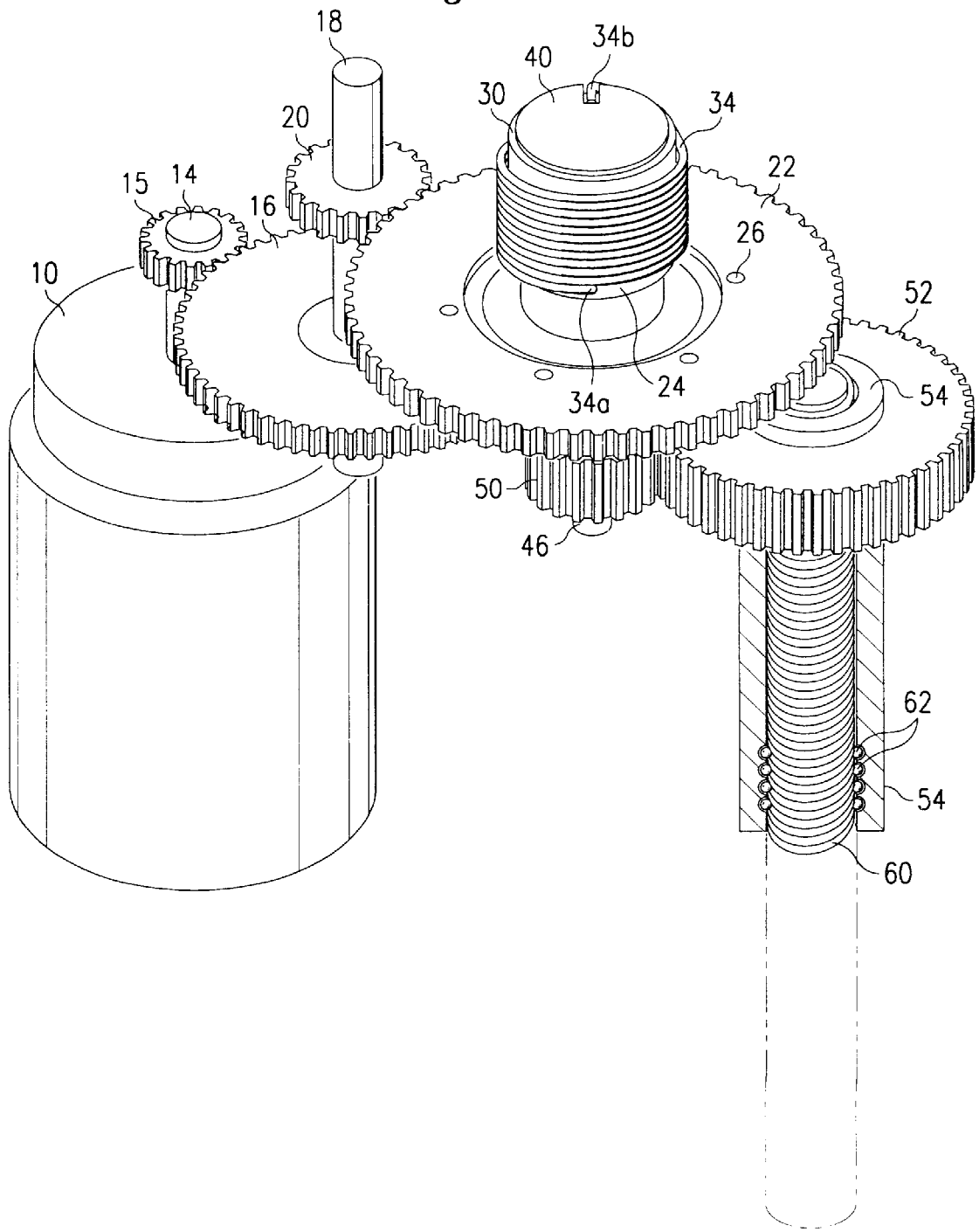
FIG. 2 is an exploded, enlarged isometric view of several components of the actuator of FIG. 1.

Referring to FIGS. 1 and 2 of the drawing, the reference numeral 10 refers, in general, to a power source, which, for the purpose of example, can be an AC motor which is connected in any known manner, such as by bolts, to the outer surface of one wall of a circular casing 12. An output shaft 14 extends from the motor 10 into the interior of the casing 12 where it is connected to a pinion gear 15 which is in engagement with a spur gear 16.

The spur gear 16 is circular in cross section and has a central opening which receives a shaft 18 which is coupled to the gear 16 in a conventional manner. Therefore, rotation of the output shaft 14 by the motor 10 causes corresponding rotation of the spur gear 16 and the shaft 18. A pinion gear 20 also extends around, and is coupled to, the shaft 18 in an axially-spaced relation to the spur gear 16. Another spur gear 22 is provided which is in engagement with the pinion gear 20. Therefore, the above-mentioned rotation of the shaft 18 causes rotation of the pinion gear 20 to drive the spur gear 22. It is understood that the gears 15, 16, 20 and 22 are supported for rotation in the casing 12 in any conventional manner and that the gears are designed such that the speed of the spur gear 22 is substantially reduced from the speed of the output shaft 14 of the motor 10, in a conventional manner.

The spur gear 22 has an enlarged central opening through which a mounting flange 23 extends. An inner race 24 is threadedly connected to the mounting flange 23 and a plurality of bolts 26 extend through aligned openings in the mounting flange and the gear 22 to couple the gear to the inner race.

A portion of the inner race 24 projects upwardly, as viewed in FIGS. 1 and 2, through an opening in the casing 12 and the inner and outer surfaces of the inner race 24 are stepped. A ring-shaped sprag clutch 28 extends around the mounting flange 23 and functions to permit rotation of the mounting flange, and therefore the inner race 24, in only one direction. Therefore, the above-described, relatively low-speed rotation of the spur gear 22 causes rotation of the mounting flange 23, and therefore the inner race 24, which rotation is permitted in one, predetermined direction by the sprag clutch 28.

The upper portion of a cylindrical driver 30, as viewed in FIG. 1, extends within the upper end portion of the inner race 24. The outer surface of the driver 30 and the inner surface of the inner race 24 are stepped and complementary so that the upper portion of the inner race receives the corresponding lower surface of the driver in a slightly spaced relation. Thus, the upper portion of the inner race 24 can rotate around the overlapped lower portion of the driver 30 under conditions to be described.

A wrap spring 34 normally extends around the outer surfaces of the driver 30 and the inner race 24 in a loose fit, and functions as a clutch. To this end, a tang 34a is formed on the lower portion of the wrap spring 34 and extends into a corresponding notch formed in the outer surface of the inner race 24. A control module 40, shown generally in FIGS. 1 and 2, is disposed in the upper end portion of the driver 30 and will be described in detail later. A tang 34b (FIG. 2) is formed on the upper end of the wrap spring and extends into a notch formed in control module 40. (Although not clear in FIG. 2 due to limitations of scale, the tang 34b actually extends in a notch in the washer 110 of the control module 40.) An outer race 41 extends over the mounting flange 23 and the inner race 24 and a cover 42 is mounted on the outer race and encases the control module 40, the driver 30, the wrap spring 34 and the inner race 24a.

An electrical switching device, such as a solenoid 44, is mounted to an end plate of the cover 42 and has an armature 44a that extends through an opening in the latter end plate and engages the upper portion of the control module 40. The armature 44a moves between an extended position when the solenoid is energized to actuate the control module 40 in a manner to be described, and a retracted position (under the force of a spring, or the like) when the solenoid is de-energized. The wrap spring 34, and therefore the control module 40 rotate with the inner race 24. When the armature 44a of the solenoid 44 actuates the control module 40 and the control module latches to the stationary driver 30 in a manner to be described, the upper end of the wrap spring 34 is thus restrained against movement, causing the wrap spring to tighten over the outer surfaces of the inner race 24 and the driver 30. This couples the inner race 24 to the driver 30 and thus transmits torque from the inner race to the driver, also in a manner to be described.

An output shaft 46 is disposed in the lower portion of the driver 30 in a coaxial relationship, extends through the inner race 24 and projects downwardly from the lower end of the inner race. A radially-extending set screw 48 extends through an opening in the driver 30 and engages the output shaft 46 to lock the shaft to the driver so that the shaft rotates with the driver.

A pinion 50 is disposed on the lower, projecting end portion of the output shaft 46 and engages a spur gear 52 which is connected to, and extends around the upper end portion of an elongated ball nut 54. The upper portion of the ball nut 54 extends in the casing 12 and the ball nut is mounted for rotation in a bearing assembly 56 located adjacent to an opening in the latter casing through which the ball nut projects. Therefore, when the rotating inner race 24 is coupled to the driver 30 by the wrap spring 34 as controlled by the armature 44a and the control module 40 in a manner to be described, the driver 30, and therefore the output shaft 46 and the pinion 50, rotate accordingly. This rotates the gear 52 causing corresponding rotation of the ball nut 54.

A helically grooved ball screw 60 is disposed in the ball nut 54 and the inner portion of the lower end portion of the ball nut 54 is provided with a helical groove that complements the groove in the ball screw 60 so as to receive a plurality of balls 62. As a result, rotation of the ball nut 54 causes corresponding axial movement of the ball screw 60 between a retracted position shown in FIG. 1 and by the solid lines in FIG. 2, and an extended position shown by the phantom lines in FIG. 2.

A head 64 is bolted to the lower portion of the casing 12 and a housing 66 is connected to, and extends downwardly from, the head and around the ball nut 54. A thrust bearing 68 extends in an area defined by a stepped portion of the head 64, the upper end portion of the housing 66, and a corresponding surface of the ball nut 54. A flange 54a extends radially outwardly from the lower portion of the ball nut 54 and engages the thrust bearing 68 in the retracted position of the ball screw, as shown.

The lower end portion 60a of the ball screw 60 is enlarged and is in threaded engagement with a cylindrical adapter 70 that has a sleeve 70a extending in a radially-spaced relation to the ball nut 54 in the housing 66. Two elongated, diametrically opposed, slots 70b and 70c are provided in the sleeve 70a of the adapter 70 which respectively receive two radially extending set screws 74a and 74b extending through corresponding openings in the housing 66. As a result, rotation of the ball screw 60 with the ball nut 54 is prevented so that the ball screw will extend or retract axially relative to the ball nut when the nut is rotated.

The lower end of the adapter 70 abuts against a plate 75 that is connected to a spool sleeve 76 which, in turn, is connected to an upper spring plate 77. Central openings are formed through the adapter 70 and the plate 75 to permit a stem 78 to be connected to the lower end of the ball screw 60. To this end, a spring bolt 79 has a head portion 79a disposed in an enlarged opening in the lower end portion of the adapter 70 and a shaft portion 79b that extends through the opening in the plate 75 and into the upper end portion of the stem 78 and is connected to the stem in any known manner. The upper end of the stem 78 extends in a corresponding opening formed in the lower portion of the plate 75. As a result of this arrangement, the stem 78, the plate 75, and all components connected thereto, are separate from the ball screw 60 and the plate 70. This not only aids in manufacture and assembly, but insures that no torque from the rotating ball nut 54 will be applied to the stem 78 and any valve, or the like, connected thereto.

A lower spring plate 80 extends around the stem 78 and normally extends in a spaced relation to the plate 75, and a helical spring 82 extends between the upper spring plate 77 and the lower spring plate 80. The lower spring plate 80 is maintained in a stationary position by a packing retainer 84 that extends around the stem 78 and is secured to a bonnet 86. An outer cylindrical housing 88 extends from the head 64 to the bonnet 86, is mechanically connected to each, and encloses the lower portion of the ball nut 54 and its associated components. A plurality of shims 89 are mounted on the upper surface of the spring plate 80 and function to control the stroke length of the ball screw 60, as will be described.

The stem 78 reciprocates with the ball screw 60 and relative to the fixed lower spring plate 80, the packing retainer 84, and the bonnet 86. The stem 78 has an enlarged lower head portion 78a which projects from the lower surface of the bonnet 86 and which is adapted to be connected to a device (not shown), such as a gate valve, which is to be actuated by the assembly of the present invention. Thus, when the ball nut 54 is rotated and the ball screw 60 moves downwardly to its extended position shown by the phantom lines in FIG. 2, it causes corresponding downward movement of the adapter 70, the plate 75, the spool sleeve 76, the upper spring plate 77 and the stem 78. The spring 82 is thus compressed between the upper spring plate 77 and the fixed lower spring plate 80 and is adapted to return the ball screw 60 back to its retracted position in a manner to be described.

Figure 3:
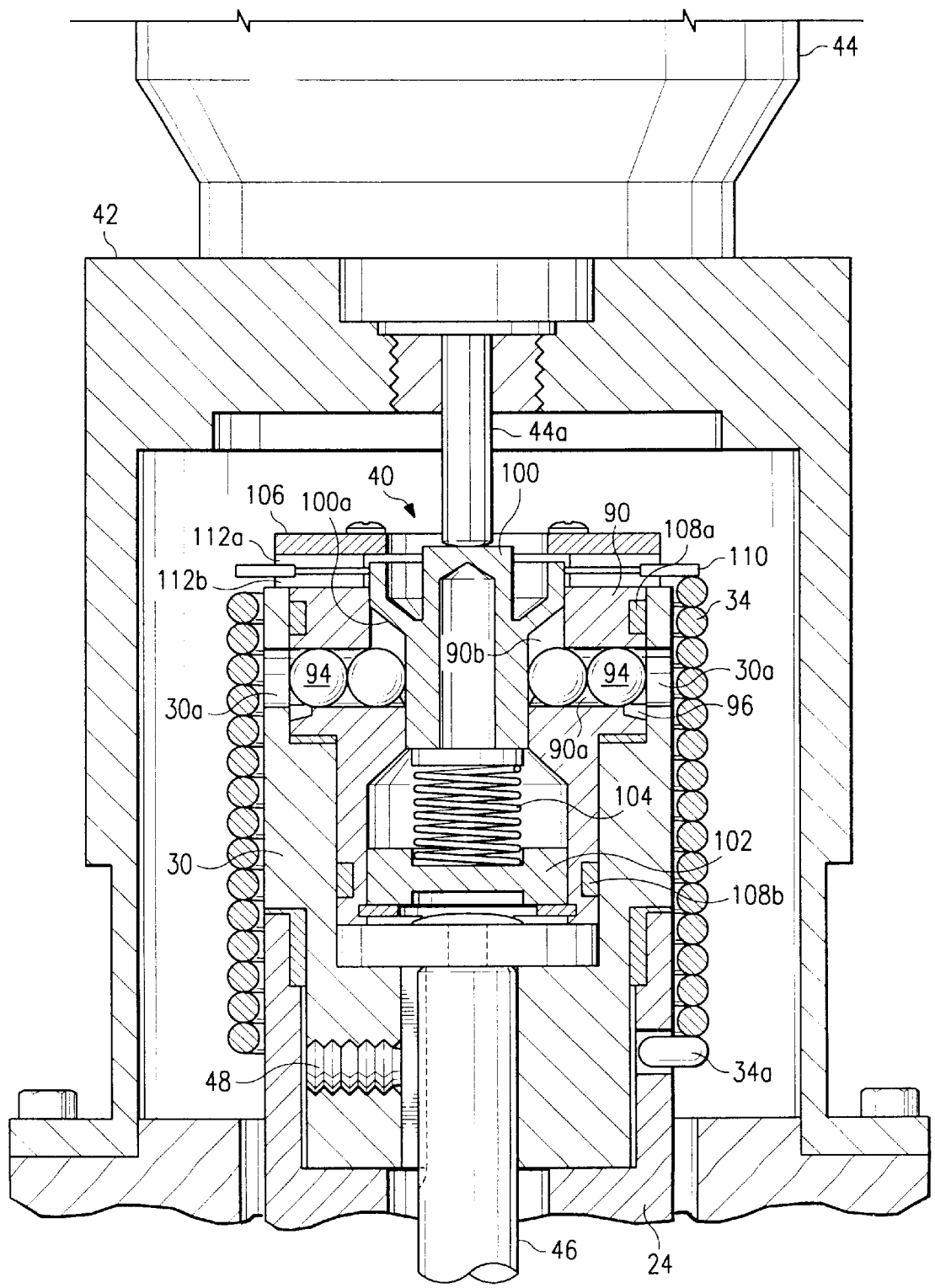
FIG. 3 is an enlarged cross-sectional view of the control module of FIGS. 1 and 2.

Details of the control module 40 are shown in FIG. 3. More particularly, the control module 40 includes a hub 90 having a stepped outer surface that nests within the stepped inner surface of the driver 30 in a slightly spaced relationship to the driver 30 to permit rotational movement of the hub relative to the driver. Six radially-extending, angularly-spaced, passages 90a are formed through the hub 90 all of which register with a central bore 90b also extending through the hub.

Two balls 94 are disposed in each of the passages 90a and are retained therein by a retaining member 96 disposed in a groove formed in the hub 90 near the outer ends of the passages. The retaining member 96 projects slightly outwardly from the latter groove to normally retain the balls 94 in their respective passages 90a.

A plurality of holes, two of which are shown by the reference numerals 30a, are angularly spaced around the inner surface of the driver 30. Therefore, when the outer ball 94 in each passage 90a is forced past the retaining member 96 and into a hole 30a under conditions to be described, the control module 40 is latched to the driver 30.

A plunger 100 is disposed in the bore 90b of the hub 90 and has a tapered outer surface 100a. A cup 102 is disposed in the lower portion of the hub 90, as viewed in FIG. 3, and a spring 104 extends between the lower end of the plunger 100 and the cup 102 to normally urge the plunger upwardly as viewed in FIG. 3. An annular cover disk 106 extends over the upper ends of the hub 90 and has a central opening that receives the upper end of the plunger 100 and the lower end of the armature 44a of the solenoid 44.

A pair of axially-spaced wear rings 108a and 108b are provided through corresponding grooves formed in the outer surface of the hub 90, and a washer 110 extends between two pads 112a and 112b located just above the hub 90. The outer portion of the washer 110 projects outwardly from the driver 30 and retains the wrap spring 34 adjacent to the outer surfaces of the driver 30 and the inner race 24. As shown in FIG. 2, a notch is formed in the upper surface of the washer 110 which receives the tang 34b of the wrap spring 34, as discussed above.

In operation, it will be assumed that the actuator assembly is oriented as shown in FIGS. 1 and 2, i.e., so that the ball screw 60 moves downwardly towards its extended position, and upwardly to its retracted position. It will also be assumed that the armature 44a of the solenoid is in its de-energized, retracted position of FIG. 3; and the ball screw 60 is initially in its fully retracted position shown in FIG. 1 and by the solid lines in FIG. 2. The solenoid 44 is initially actuated causing its armature 44a to push the plunger 100 of the control module 40 downwardly against the force of the spring 104. The tapered surface 100a of the latter plunger 100 thus engages the inner ball 94 in each passage 90a and forces the balls 94 radially outwardly, causing the outer ball in each passage 90a to be forced past the retaining member 96 and into a hole 30a of the driver 30. This latches the control module 40 to the driver 30 and permits the wrap spring 34 to couple the inner race 24 to the driver 30 as will be described.

The motor 10 is then turned on which drives its output shaft 14, the gear 16, and therefore the shaft 18, and the pinion 20. The pinion 20, in turn, drives the gear 22 and therefore the inner race 24, with the above-described gears and pinions reducing the rotational speed of the inner race when compared to that of the output shaft 14 of the motor 10. Since the tangs 34a and 34b of the wrap spring 34 are respectively connected to the inner race 24 and to the control module 40, this rotation of the inner race 24 causes rotation of the wrap spring 34 and therefore the control module 40. Since the balls 94 of the control module 40 are extending in the holes 30a in the driver 30, this initial rotation of the control module 40 causes the wrap spring 34 to immediately tighten over the driver 30 and couples the inner race 24 to the driver in the manner described above. Therefore, the driver 30 and the shaft 46 also rotate at the same reduced speed.

The rotation of the shaft 46 causes corresponding rotation of the pinion 50, the gear 52, and the ball nut 54, causing the ball screw 60 to move axially from its retracted position shown in FIG. 1 to its fully extended, operative position shown by the phantom lines in FIG. 2. The plate 75 and the stem 78 also move with the ball screw 60 to its extended position until the plate 75 (FIG. 1) engages the shims 89 on the fixed lower spring plate 80, and the spring 82 is compressed accordingly. If a gate valve, or other device, is connected to the stem 78, the gate valve would be in its actuated position, which could be either opened or closed, depending on the particular design of the system.

In this fully extended, operative position, the motor 10 is turned off by a position sensor, a timer, or the like, and the ball screw 60 is maintained in the latter position by the solenoid 44 and the control module 40 which maintain the connection between the inner race 24 and the driver 30. According to a feature of the invention, with the motor 10 turned off, the sprag clutch 28 prevents back rotation of inner race 24, and therefore the gears 22, 20, 16 and 15, under the force of the compressed spring 82.

In the event it is desired to move the device connected to the stem 78 back to the retracted position shown in FIG. 1 and by the solid lines of FIG. 2, or in the event of a power failure, the solenoid 44 is turned off, or de-energized. This causes the armature 44a to retract and release its engagement with the plunger 100 of the control module 40 which, in turn, permits the balls 94 of the control module 40 to disengage from the holes 30a in the driver 30 and unlatch the control module, and therefore the inner race 24, from the driver. As a result, the wrap spring 34 is loosened and thus releases the coupling between the inner race 24 and the driver 30. The forces exerted by the compressed spring 82 on the upper spring plate 77, and therefore the plate 75, as well as any external forces, such as valve body pressure, or the like, acting on the stem 78, forces the ball screw 60 upwardly towards its retracted position shown in FIG. 1 and by the solid lines in FIG. 2. Since the driver 30 is decoupled from the inner race 24, this upward movement the ball screw 60 causes rotation of the ball nut 54, the gear 52, the pinion 50, the output shaft 46 and the driver 30 in a direction that is opposite to the direction of rotation discussed above in connection with the extension of the ball screw 60. This retracting movement of the ball screw 60 continues until the ball screw reaches the fully retracted position shown in FIG. 1 and by the solid lines in FIG. 2., with the sprag clutch 28 preventing back rotation of the remaining gear train discussed above. Thus, the stem 78, as well as any device connected to the stem, would also be moved back to its original position.

The actuator assembly of the present invention thus enjoys several advantages. For example, it controls the large forces required to retract or extend the ball screw with a device that latches the system in response to a holding signal that consumes a relatively low amount of power for a relatively long time. For example, in one design of the assembly of the present invention, over 800 watts of power is required to drive the motor 10 to extend the ball screw 60 in the manner described above, while only approximately 8 watts is required to actuate the solenoid 44. Also, the actuator assembly of the present invention, by virtue of the balls 94 of the control module engaging the holes 30a in the inner wall of the driver 30 at multiple, angularly-spaced locations, is stable and reliable and resists vibration and environmental factors which tend to "trip" the unit. Also minimal gearing is provided between the control module and the ball nut to eliminate the possibility of multiple gears becoming jammed if a malfunction occurs. Further, the sprag clutch 28 prevents backward rotation of the gears 15, 16, 20 and 22 when the ball screw 60 is in its extended position, after the motor 10 has been turned off, and before the solenoid 44 has be de-energized. Also, the stem 78, the plate 75 and all components connected thereto, are separate from the ball screw 60 and the plate 70. As stated above, this aids in manufacture and assembly, and insures that no torque from the rotating ball nut 54 will be applied to the stem 78 and any valve, or the like, connected thereto.

It is understood that other components, such as a mechanical override, a dampener system, and a torque limiter can be provided with the assembly of FIGS. 1 and 2, but have not been shown or described in detail for the convenience of presentation.

It is also understood that variations may be made in the foregoing without departing from the scope of the present invention. For example, the AC motor 10 can be replaced by any alternative power source including, but not limited to, a DC motor, a hydraulic or pneumatic unit, or the like; and the solenoid can be replaced by any other type of electrical switching unit or a mechanical actuator. Also, the number of openings 30a in the driver 30 as well as the corresponding number of balls 94 can be varied within the scope of the invention. Further, the balls 94 in each passageway 90a can be replaced by a single elongated member.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. An actuator assembly for moving a device between a retracted and extended position, the assembly comprising a nut member, a ball screw adapted to be connected to the device, the ball screw being in threaded engagement with the nut member and movable from a retracted to an extended position upon rotation of the nut member, a member for producing torque, a drive assembly adapted to be operatively connected between the torque producing member and the nut member for transferring the torque therebetween to rotate the nut member, and a control system for selectively connecting the drive assembly between the torque producing member and the nut member, the control system comprising an inner race operatively connected to one of the members, a driver operatively connected to the other member and having a bore, a wrap spring extending around a portion of the inner race and a portion of the driver, and a control module extending in the bore and adapted to rotate in the bore, the control module being responsive to an input signal for engaging the inner wall of the driver defining the bore at multiple areas thereof for latching to the driver, the wrap spring being connected to the inner race and to the control module so that, upon actuation of the torque producing member, the inner race, and therefore the wrap spring and the control module, rotate relative to the driver, and, in response to application of the input signal, the control module latches to the driver to tighten the wrap spring around the inner race and the driver to couple the inner race to the driver and transfer the torque from the output shaft to the nut member to rotate the nut member.

2. The assembly of claim 1 wherein a portion of the driver is nested within the inner race in a manner to permit rotation of the inner race relative to the driver when the wrap spring is not tightened around the inner race and the driver.

3. The assembly of claim 1 wherein multiple holes are formed in the inner surface of the driver, and wherein the control module comprises a latching member associated with each hole, and a plunger responsive to the input signal for urging the latching member into engagement with its corresponding hole to latch the control module to the driver and therefore tighten the wrap spring around the inner race and the driver to connect the drive assembly between the torque producing member and the nut member.

4. The assembly of claim 3 wherein the latching members are in the form of balls that extend in the holes to latch the control module to the driver.

5. The assembly of claim 4 further comprising an electrical switching device adapted to respond to the input signal and move the plunger in a manner to urge the latching members into engagement with the holes.

6. The assembly of claim 1 wherein the inner race is connected to the output shaft and the driver is connected to the nut member.

7. The assembly of claim 1 further comprising a spring associated with the ball screw and adapted to compress in response to the movement of the ball screw to its extended position and force the ball screw back to its retracted position upon removal of the input signal.

8. The assembly of claim 1 wherein the drive assembly comprises at least one gear, and further comprising a clutch associated with the at least one gear for permitting rotation of the at least one gear in one direction while preventing rotation in the opposite direction.

9. An actuator assembly for moving a device between a retracted and extended position, the assembly comprising a nut member; a ball screw adapted to be connected to the device, the ball screw being in threaded engagement with the nut member and movable from a retracted to an extended position upon rotation of the nut member; a member for producing torque and having an output shaft, at least one gear operatively connected between the output shaft and the nut member for transferring the torque therebetween to rotate the nut member; a control system for selectively connecting the at least one gear between the output shaft and the nut member, the control system comprising an inner race operatively connected to one of the members, a driver operatively connected to the other member, a wrap spring extending around a portion of the inner race and a portion of the driver, and a control module responsive to an input signal for engaging the inner wall of the driver for latching to the driver, the wrap spring being connected to the inner race and to the control module so that, upon actuation of the output shaft, the inner race, and therefore the wrap spring and the control module, rotate relative to the driver, and, in response to application of the input signal, the control module latches to the driver to tighten the wrap spring around the inner race and the driver to couple the inner race to the driver and transfer the torque from the output shaft to the nut member to rotate the nut member, wherein the at least one gear reduces the rotational speed of the inner race when compared to that of the output shaft; a drive shaft connected to the driver; and a gear connecting the drive shaft to the ball nut for rotating the ball nut in response to rotation of the driver and therefore the drive shaft.

10. The assembly of claim 9 wherein a portion of the driver is nested within the inner race in a manner to permit rotation of the inner race relative to the driver when the wrap spring is not tightened around the inner race and the driver.

11. The assembly of claim 9 wherein the driver has a bore and wherein the control module extends within the bore and rotates in the bore before application of the input signal.

12. The assembly of claim 11 wherein, upon application of the input signal, the control module engages the bore at multiple areas of the inner wall of the driver defining the bore to latch the control module to the driver.

13. The assembly of claim 12 wherein multiple holes are formed in the inner surface of the driver, and wherein the control module comprises a latching member associated with each hole, and a plunger responsive to the input signal for urging the latching member into engagement with its corresponding hole to latch the control module to the driver and therefore tighten the wrap spring around the inner race and the driver to connect the drive assembly between the output shaft and the nut member.

14. The assembly of claim 13 wherein the latching members are in the form of balls that extend in the holes to latch the control module to the driver.

15. The assembly of claim 14 further comprising an electrical switching device adapted to respond to the input signal and move the plunger in a manner to urge the latching members into engagement with the holes.

16. The assembly of claim 15 wherein the inner race is connected to the output shaft and the driver is connected to the nut member.

17. The assembly of claim 16 further comprising a spring associated with the ball screw and adapted to compress in response to the movement of the ball screw to its extended position and force the ball screw back to its retracted position upon removal of the input signal.

18. The assembly of claim 17 wherein the drive assembly comprises at least ne gear, and further comprising a clutch associated with the at least one gear for permitting rotation of the at least one gear in one direction while preventing rotation in the opposite direction.

* * * * *